United States Patent
Patro et al.

(10) Patent No.: US 12,074,953 B2
(45) Date of Patent: Aug. 27, 2024

(54) FRAMEWORK FOR MANAGING CONFIGURATIONS OF CLOUD COMPUTING RESOURCES

(71) Applicant: Microsoft Technology Licensing, LLC, Redmond, WA (US)

(72) Inventors: Sameer Kumar Patro, Bhubaneswar (IN); Aritra Basu, Bangalore (IN); Raghavendra Subhash, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 17/483,496

(22) Filed: Sep. 23, 2021

(65) Prior Publication Data

US 2023/0090828 A1    Mar. 23, 2023

(51) Int. Cl.
*H04L 67/51* (2022.01)
*H04L 41/0813* (2022.01)

(52) U.S. Cl.
CPC .......... *H04L 67/51* (2022.05); *H04L 41/0813* (2013.01)

(58) Field of Classification Search
None
See application file for complete search history.

(56) References Cited

U.S. PATENT DOCUMENTS

| | | | |
|---|---|---|---|
| 8,954,399 B1 * | 2/2015 | Balakrishnan | G06F 16/1752 707/692 |
| 10,977,068 B2 * | 4/2021 | Cortez | G06F 9/4856 |
| 2014/0089474 A1 * | 3/2014 | Zenz | H04L 41/0233 709/221 |
| 2017/0085640 A1 * | 3/2017 | Mandal | H04L 67/1097 |
| 2021/0142223 A1 * | 5/2021 | Choudhury | G06F 16/901 |
| 2022/0215775 A1 * | 7/2022 | Kosstrin-Greenberg | G09B 7/08 |

OTHER PUBLICATIONS

Papazoglou, et al., "Service oriented architectures: approaches, technologies and research issues", In Journal of VLDB journal, vol. 16, Issue 3, Jul. 2007, pp. 389-415.
"International Search Report and Written Opinion Issued in PCT Application No. PCT/US22/039227", Mailed Date: Oct. 13, 2022, 12 Pages.

* cited by examiner

*Primary Examiner* — Atta Khan
(74) *Attorney, Agent, or Firm* — Holzer Patel Drennan

(57) ABSTRACT

The present disclosure relates to generating, updating, modifying, and otherwise managing configurations for virtual services on a cloud computing system. The present disclosure provides example implementations of a configuration management system and configuration handlers on respective server nodes that receive and process requests for modifying one or more configurations that manage operation of virtual services on the cloud. Systems described herein involve leveraging a hierarchical model of configuration characteristics to facilitate both large and small scale modifications. Moreover, the systems described herein leverage a persistent store on server nodes to identify how to update a current base configuration and sub-version as well as synchronize modifications across a set of server nodes.

21 Claims, 6 Drawing Sheets

FRAMEWORK FOR MANAGING CONFIGURATIONS OF CLOUD COMPUTING RESOURCES

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing configurations across a wide variety of services and network devices has become increasingly difficult. For example, as more and more cloud computing resources become available, managing configuration of the deployed resources similarly grows in difficulty. Indeed, as a result of a higher number of different types of resources as well as the decentralized nature of cloud computing systems, implementing new configurations as well as modifying existing configurations has become a time consuming and computationally prohibitive process. This difficulty is exacerbated where a tight coupling often exists between individual service deployments and associated configurations.

These and other difficulties exist in connection with creating, updating, modifying, and otherwise managing service configurations on a cloud computing system.

DETAILED DESCRIPTION

Figure 1:
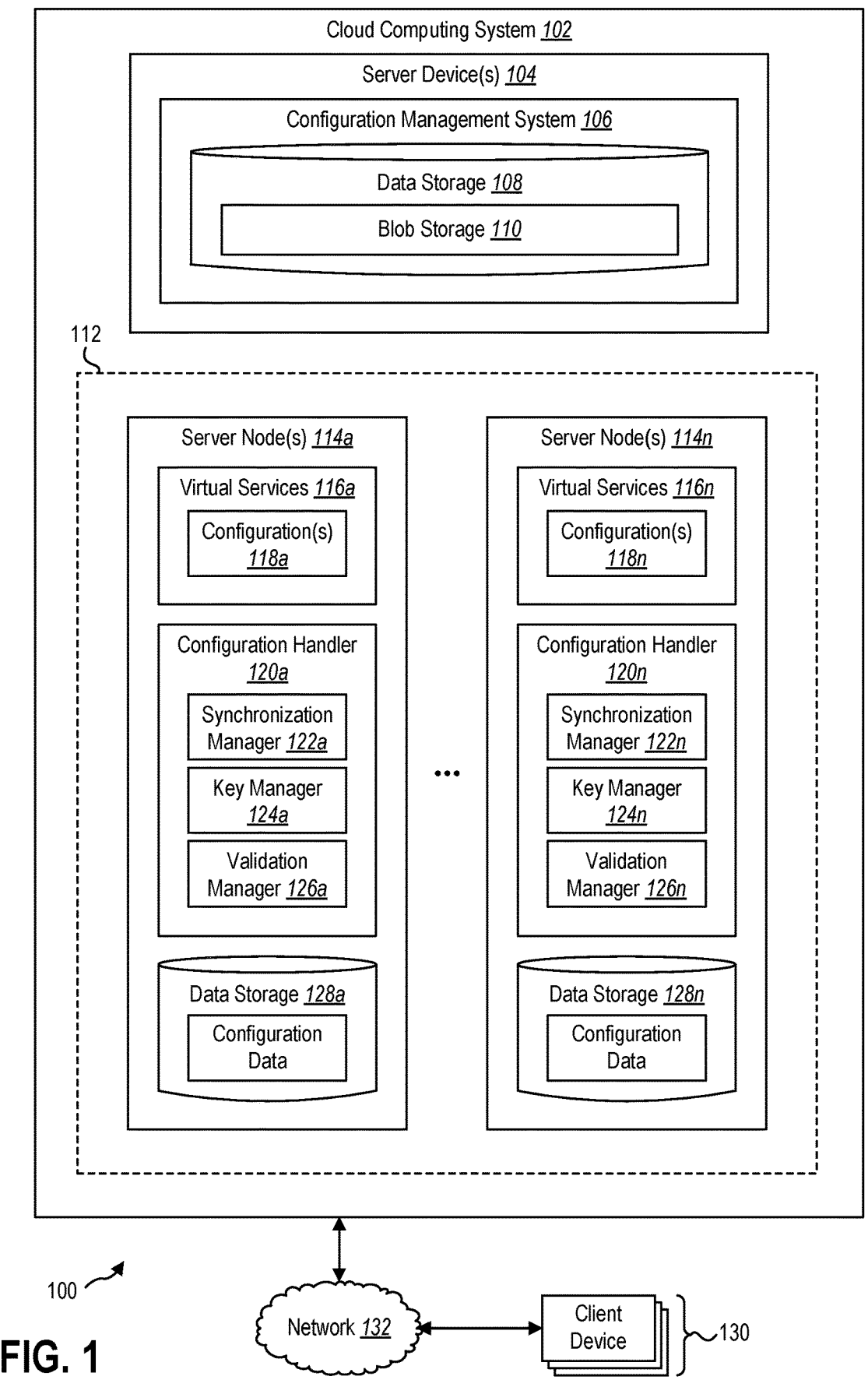
FIG. 1 illustrates an example environment of a cloud computing system including systems for managing configurations of virtual services on server nodes of the cloud computing system.

The present disclosure is generally related to generating, updating, modifying, or otherwise managing configurations for virtual services on a cloud computing system. In particular, the present disclosure provides example implementations of a configuration management system and configuration handlers capable of receiving a request to modify one or more configurations on virtual services hosted by server nodes of a cloud computing system. As will be discussed in further detail below, the configuration management system leverages a hierarchical model of configuration characteristics to enable both large and small scale modifications across the cloud. Moreover, the configuration management system and configuration handlers leverage a persistent store on one or more server nodes to efficiently identify base versions and sub-versions of various configurations as well as effectively synchronize configuration modifications across any number of server nodes and associated virtual services.

As an illustrative example, a system may receive or otherwise identify a request to modify service configurations for a plurality of virtual services on a cloud computing system. The request may include one or more hierarchical declarations indicating a grouping of virtual services affected by the identified request. The hierarchical declarations may indicate characterizations (e.g., of the virtual services, server nodes) in accordance with a hierarchical model of characteristics that may be used to identify any number of virtual services on the cloud computing system. Based on the hierarchical declaration(s), the systems described herein may determine a subset of virtual services and cause one or more service modifications indicated within the modification request to be applied to service configurations for the subset of virtual services.

The present disclosure includes a number of practical applications that provide benefits and/or solve problems associated with generating, deploying, updating, or otherwise modifying service configuration(s) of virtual services and/or network devices on a cloud computing system. Some non-limiting examples of these applications and benefits are discussed in further detail below.

For example, by creating and deploying configurations in accordance with a hierarchical model, the systems described herein can modify configurations for groupings of virtual services on the cloud computing system. For instance, a configuration modification request may identify groupings of virtual services based on a variety of characteristics within a hierarchical model such as access policies, geo-replication protocols, validators, computing zones (e.g., cloud-level, datacenter-level, cluster-level), geography, or any other grouping of devices and/or services. Defining the configurations in this way further enables the systems herein to process requests including declarations that indicate portions of the hierarchical model for which various modifications should apply.

As another example, the systems described herein may utilize key pairs to efficiently identify base version(s) (e.g., base configurations) and sub-versions of a configuration to implement versioning of the configuration(s). The key pairs may enable one or more systems described herein to ascertain a latest version as well as establish an order of modifications to one or more configurations. As will be discussed in further detail below, the key pairs may include a configuration key and version key whose values provide versioning information and flexibility for a virtual service to revert to any configuration version.

The systems described herein further facilitate an eventually consistent modification technique by implementing a hybrid synchronization mechanism that is scalable anywhere from modifying a configuration for a single node or across multiple node clusters. Indeed, as will be discussed in further detail below the hybrid synchronization mechanism may make use of a synchronization protocol and/or a gossip protocol. The synchronization mechanism further leverages a global configuration version and configuration event key capable of triggering a synchronization process that provides an eventually consistent configuration framework across any number of server nodes and/or virtual services.

In addition to the above, one or more embodiments described herein facilitate modification to configurations on server nodes where limited memory is available, such as on the framework of an edge network. For instance, while one or more embodiments described herein may be implemented using any persistent store on the cloud having a high amount of available memory or storage, other embodiments may be implemented within a framework having limited memory availability. Thus, in one or more embodiments, the systems described herein implement configuration modifications using a read and write optimized log structured merge (LSM) in which one or more B+ trees are used within a persistent store on an edge network. Indeed, as will be discussed in further detail below, configuration modifications may be written to a journal log, persisted in a memory table, and flushed to a B+ tree structure.

As illustrated in the foregoing discussion, the present disclosure utilizes a variety of terms to describe features and advantages of the systems described herein. Additional detail is now provided regarding the meaning of some example terms.

For example, as used herein, a "cloud computing system" refers to a network of connected computing devices that provide various services to customer devices (e.g., client devices, server devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters can similarly relate to racks, regions of nodes, datacenters, or other hierarchical structures in which network devices are grouped together. The cloud computing system may refer to a private or public cloud computing system.

In one or more embodiments described herein, a server node may refer to a computing node that is implemented as part of an edge zone or edge network. As used herein, an "edge network" or "edge zone" may refer interchangeably to an extension of the cloud computing system located on a periphery of the cloud computing system. The edge zone may refer to a hierarchy of one or more devices that provide connectivity to devices and/or services on a datacenter within a cloud computing system framework. An edge zone may provide a number of cloud computing services on local hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system.

As used a "computing device," "network device," or "server node" may refer to any configurable device implemented within an environment of networked computing devices, such as devices on a cloud computing system, edge network, or other hierarchical network of computing devices. Indeed, a computing device or server node may refer to any of a variety of devices that perform various functions on a private or public cloud computing system. By way of example, a computing device may refer to server nodes, enterprise devices, storage devices, routers, switches, firewalls, load balancers, and storage arrays. As will be discussed in further detail below, each of the computing devices described herein may include one or more configurations implemented thereon. Each configuration may be unique to each specific device and/or virtual service hosted on the respective device(s).

As used herein, a "configuration" may refer generally to any information indicating rules, policies, and commands associated with operation of a corresponding computing device and/or virtual service(s). For example, as used herein, a "service configuration" may refer to any configuration applicable to a virtual service (e.g., a container, virtual machine) hosted by a server node. In addition, a "device configuration" may refer to any configuration applicable to operation of a hardware device within a framework of a cloud computing system. A device configuration may further provide policies that are applicable to virtual services running thereon. While one or more embodiments described herein refer specifically to service configurations and/or device configurations, features described generally in connection with configurations herein may apply to both service and device configurations.

As will be discussed in further detail herein, one or more modifications may be made to one or more configurations. As used herein, a "modification" or "configuration modification" may refer to a variety of actions related to implementing, changing, updating, replacing, refreshing, or otherwise modifying a configuration in any way. For example, in one or more embodiments described herein, modifying a configuration may involve updating a configuration for a base configuration from one version of the base configuration to another version of the base configuration. Alternatively, modifying a configuration may involve downgrading a configuration to a previous version of the base configuration. In one or more embodiments, modifying a configuration may involve deploying a new configuration on a computing device, changing from a first base configuration to a second base configuration, or any other modification of an applicable set of policies on a device and/or services. Indeed, in one or more examples described below, a configuration modification may refer to a configuration update associated with initial deployment of a configuration or migration of code from a latest version or, alternatively to a process of updating one or more policies of a configuration during a normal run of the service(s) or device(s).

In one or more embodiments described herein, one or multiple configurations may have a framework that facilitates modifications in accordance with a hierarchical model. As used herein, a hierarchical model may refer to a model of hierarchical characteristics including commands, permissions, access policies, and other features of a configuration associated with operation of a device and/or service within a framework of a cloud computing system. As will be discussed in further detail below, a hierarchical model may include a tree structure (e.g., a configuration tree) that is instantiated using extensible markup language (XML) (e.g., an XML data model instantiation), a JavaScript Object Notation (JSON), or other framework that enables the model to be referenced at a specific level or node within the hierarchical model.

Additional detail will now be provided regarding systems described herein in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 may include one or more server device(s) 104 and a configuration management system 106 implemented thereon. As will be discussed in further detail below, the configuration management system 106 may provide features and functionality related to receiving, processing, and implementing modification requests for a variety of configurations that are deployed across devices and services of the cloud computing system 102.

The configuration management system 106 may be implemented on a server device 104 in accordance with a variety of implementations. For example, as shown in FIG. 1, the configuration management system 106 is implemented on a server device 104 that services any number of server nodes on the cloud computing system 102. It will be appreciated that different computing zones may engage the services of a respective configuration management system 106. For example, in one or more embodiments, the configuration management system 106 is implemented on a cluster-level and configured to service server nodes of a given node cluster. In one or more embodiments, the configuration management system 106 is implemented on an edge zone and configured to service server nodes on the edge zone. In one or more embodiments, the configuration management system 106 is implemented at a datacenter level and configured to service any number of server nodes on the datacenter.

As shown in FIG. 1, the configuration management system 106 includes a data storage 108 having a blob storage 110 thereon. As will be discussed in further detail below, the blob storage 110 may serve as a persistent storage for configuration handlers on a plurality of server nodes. In one or more embodiments, the blob storage 110 is a distributed storage including data that is accessible to any number of server nodes. As will be discussed in further detail below, the blob storage 110 may provide access to configuration data, such as global configuration keys, global counter values, and any configuration data persisted on the configuration management system 106 that is accessible to various server nodes.

As shown in FIG. 1, the cloud computing system 102 includes a computing zone 112 having a plurality of server nodes 114*a-n* thereon. The computing zone 112 may refer to any grouping of server nodes 114*a-n* in accordance with one or more embodiments described herein. For example, in one or more embodiments, the computing zone 112 may refer to a node cluster including a grouping of server nodes 114*a-n* on the node cluster. Alternatively, in one or more embodiments, the computing zone 112 may refer to an edge network having one or more server racks at a remote location from an internal framework of the cloud computing system 102. In one or more embodiments, the computing zone 112 refers to a datacenter or other grouping of server nodes 114*a-n* within a given datacenter. Indeed, the computing zone 112 may represent any grouping of server nodes 114*a-n* including any number and variety of network devices on the cloud computing system 102. In one or more embodiments, the computing zone 112 includes the server device(s) 104 having the configuration management system 106 implemented thereon.

As mentioned above, the computing zone 112 includes a plurality of server node(s) 114*a-n* having virtual services 116*a-n* (e.g., containers, virtual machines) thereon that operate in accordance with one or more configurations 118*a-n*. As further shown, each of the server nodes 114*a-n* include configuration handlers 120*a-n* thereon. The configuration handlers 120*a-n* may perform features and functionalities described herein in connection with processing configuration modification requests and causing service modifications to be applied to devices and services of the computing zone 112.

For example, each of the configuration handlers 120*a-n* may include synchronization managers 122*a-n*, key managers 124*a-n*, and validation managers 126*a-n* for implementing one or more features of the configuration handlers 120*a-n* described herein. As further shown, the server nodes 114*a-n* may include data storages 128*a-n* having configuration data thereon that relates to the configurations 118*a-n* running on the respective server nodes 114*a-n*.

As shown in FIG. 1, the environment 100 may further include a plurality of client devices 130 that communicate with devices on the cloud computing system 102 by way of a network 132. The client devices 130 may refer to various types of computing devices including, by way of example, mobile devices, desktop computers, server devices, or other types of computing devices. The network 132 may include one or multiple networks that use one or more communication platforms or technologies for transmitting data. For example, the network 132 may include the Internet or other data link that enables transport of electronic data between respective client devices 130 and devices (e.g., server nodes 114*a-n*) of the cloud computing system 102.

Additional detail will now be discussed in connection with the configuration management system 106 and a first configuration handler 120*a* on a first server node 114*a* of the computing zone 112. It will be understood that features discussed in connection with the configuration handler 120*a* may apply to other configuration handlers on other server nodes. Moreover, it will be understood that one or more features described in connection with one of the specific components 122*a*-126*a* of the configuration handler 120*a* are described in terms of discrete components by way of example only. For example, one or more of the components 122*a*-126*a* may be implemented within a single component or on another system altogether (e.g., on the configuration management system 106).

As will be discussed in further detail below, the configuration management system 106 may receive or otherwise identify a request to modify one or more service configurations on the cloud computing system 102. The configuration modification request may include one or more declarations that indicate a specific grouping of virtual services 116*a-n* and/or server nodes 114*a-n* that should be affected by the modification request. For example, the configuration modification request may include a declaration indicating that all server nodes of the computing zone 112 should be modified in a particular way. As another example, the configuration modification request may include a declaration indicating that all server nodes of a particular model (e.g., stock keeping unit (SKU)) should be modified. Indeed, the declarations may indicate any number and variety of criteria related to specific devices and/or services that should be affected by a given modification request.

In one or more embodiments, the configuration modification request may include hierarchical declarations that indicate groupings of services and/or devices in accordance with a hierarchical model. For example, in one or more embodiments, the configuration management system 106 makes use of a global configuration framework that abstracts management and handling of configurations within a hierarchical framework. The hierarchical model may incorporate a domain-specific language (DSL) that defines configurations of services and/or devices in an XML, JSON, or another format. For example, in one or more embodiments described herein, a configuration modification request may be referred to as an XML or JSON request. Moreover, the XML or JSON request may reference a hierarchical model that forms a directed acyclic graph (DAG).

Indeed, as mentioned above, the configuration modification request (or simply a "modification request") may include one or more declarations that indicate respective portions of the hierarchical model. In particular, a modification request may include a declaration of a variety of metadata that may be used to identify groupings of relevant configurations.

By way of example and not limitation, a hierarchical declaration within a modification request may indicate one or more access policies that define access permissions for a configuration (e.g., who can access and/or perform operations on the configuration). As another example, a hierarchical declaration may indicate a geo-replication protocol defining where configurations can be replicated. As another example, a hierarchical declaration may indicate one or more validators indicating a mechanism for validating the configuration.

Other declarations may indicate specific groupings of devices and/or services to which a modification request applies. For example, in one or more embodiments, a declaration may indicate a dynamic cloud type specific to a national region, public portion of the cloud, etc. As another example, a declaration may include a dynamic region type indicating a specific region of deployment. As another example, a declaration may include a static configuration indicating one or more deployments that never change (e.g., an SKU for a particular region).

The groupings of configurations in accordance with one or more embodiments described herein can make the management of the configurations very efficient relative to conventional configuration management techniques. For example, the hierarchical structure of the model and declarations provides a mechanism for identifying both large and small groupings of services based on hierarchical characteristics defined within the hierarchical model. Additional information in connection with example implementations of the hierarchical model and identifying groupings of services based on hierarchical declarations will be discussed below in connection with FIG. 2.

Upon receiving a configuration request and identifying a particular grouping of services and/or devices for configuration modification(s), the systems described herein can enact the modifications in a variety of ways. Example implementations will be discussed in connection with the first configuration handler 120a on the server node(s) 114a. Features described in connection with the first configuration handler 120a may apply to other configuration handlers on other server nodes.

As shown in FIG. 1, a first configuration handler 120a (or simply "configuration handler 120a") may include a synchronization manager 122a, a key manager 124a, and a validation manager 126a. Each of the components 122a-126a of the configuration handler 120a may access configuration data stored on a data storage 128a, which may include any information associated with the configuration(s) 118a on the virtual service(s) 116a. Additional detail in connection with these components 122a-126a will be discussed in connection with discrete features of the configuration handler 120a.

For example, in one or more embodiments, each configuration of the virtual service(s) 116a is versioned. In one or more embodiments, the key manager 124a facilitates ascertaining a latest version of the configuration(s) 118a to establish ordering of changes in the configuration(s) 118a.

For example, in one or more embodiments, the key manager 124a creates two indices or keys in a persistent store (e.g., in the data storage 128a and/or blob storage 110). As used herein, the persistent store may refer to a data storage on a node in the cloud computing system 102 that contains a monotonically increasing number as a suffix. When a configuration is updated, the key manager 124a can create a new version of a configuration key (e.g., a base configuration identifier) in the persistent store.

In addition to generating the configuration key, the key manager 124a may additionally create a version marker (e.g., a sub-version identifier), which may be maintained in the persistent store. Thus, the key manager 124a may maintain a key pair including a base configuration identifier and a sub-version identifier within a persistent store, which provide configuration and version information for a configuration update. In one or more embodiments, the key manager 124a maintains a record of key pairs, which enables the configuration handler 120a to revert to any base configuration or corresponding sub-version. When a configuration key is created with a new sequence number, the key manager 124a can update corresponding configuration and version data within a key pair record on the persistent store. As will be discussed below, this maintenance and update mechanism of the base configuration and version key pairs can significantly simply synchronization of a modification request across a large number of server nodes. Moreover, this can be particularly useful when pushing updates across server nodes having limited memory capacity, such as nodes of an edge zone.

In addition to maintaining key pairs within a persistent store, the configuration handler 120a can facilitate configuration synchronization across any number of server nodes (e.g., server nodes 114a-n) of the cloud computing system 102. For example, as noted above, the configuration handler 120a may include a synchronization manager 122a that facilitates synchronization across server nodes 114a-n of the computing zone 112 in accordance with one or more embodiments.

As discussed above, the synchronization manager 122a may implement a hybrid mechanism that makes use of multiple protocols depending on a scope of a particular configuration modification request. As a summary, the synchronization manager 122a can implement a synchronization protocol for implementing updates or other modifications across a relatively small number of nodes (e.g., less than a threshold number of nodes or virtual services affected by a modification request). For example, where the configuration management system 106 identifies a subset of virtual services (or nodes) that number less than a threshold number of virtual services, the synchronization manager 122a may invoke a synchronization protocol.

Conversely, where a modification affects a large number of nodes or where a configuration modification is to be applied across a number of clusters, the synchronization manager 122a may use a gossip protocol. For example, where a configuration management system 106 identifies a subset of virtual services (or nodes) that number more than a threshold number of virtual services and/or where a configuration update is to be applied across multiple nodes and/or datacenters, the synchronization manager 122a may invoke a gossip protocol. Additional information in connection with these respective protocols will be discussed below in connection with FIGS. 3 and 4.

In one or more embodiments, the configuration handler 120a may further provide a read and write optimized key value store. For example, in one or more embodiments, the persistent store may be any distributed key-value store in case of services running on the cloud computing system 102 where availability is high. In this example, the persistent store may be maintained by the configuration management system 106 (e.g., on the blob storage 110). Alternatively, where the configuration framework described herein is deployed on an edge network or in an environment where memory is otherwise limited, the configuration handler 120*a* may provide an efficient and storage optimized key-value store.

In one or more embodiments, the configuration handler 120*a* (e.g., the key manager 124*a*) provides a read and write optimized LSM based key-value store that stores B+ Trees in a disk persistent structure. In particular, the configuration handler 120*a* may create a special directory within a persistent structure that provides a special directory for edge devices (or other devices of the computing zone 112). For example, the directory may include index, journal, and trash sub-directories. Moreover, the key value store may include a journal log, a memory table (or simply "mem table") and one or more B+ Trees. Each of these components will be discussed in further detail below.

In one or more embodiments, any write to the persistent store may first be written to the journal log component prior to persisting the write to the mem table. When the mem table is full, the contents may be dumped to the disk-based B+ Tree. In one or more embodiments, the mem table includes two types of tables. A first mem table may refer to an active mem table where entries are persisted. A second mem table may refer to a committed mem table where the tables are of a fixed size. When the entries are created in a corresponding mem table and reaches the fixed size, the mem table may be sealed from further writes.

Upon reaching the fixed size, the committed mem table may be queued and an asynchronous periodic thread reads the data from the committed mem table and dumps the data to a B+ Tree on a disk. Each dump of the committed mem table to the B+ Tree may change the root of the tree. Thus, in one or more embodiments, the persistent store may include multiple versions of the B+ Tree. When a read is invoked, the configuration handler 120*a* may first check the mem table and, if a value is not found, the configuration handler 120*a* can check a latest version of the B+ Tree to get the value of a corresponding key.

In one or more embodiments, when a mem table is dumped to the B+ Tree, the configuration handler 120*a* may update the root with a dump timestamp. For example, each dump of a mem table may create a separate index file containing complete B+ Tree data. In one or more embodiments, the index data is compressed using a snappy compression. Further, a journal log may be a file of a fixed size resulting in two files of fixed size, active and inactive. These files may be append-only to achieve write optimization.

In one or more embodiments, when a journal is full, the mem table data may be dumped to disk and an active file may be sealed. Upon sealing the file, the configuration handler 120*a* may remove an inactive file, mark an active file as inactive, and create a new file for active write operations. In other words, the configuration handler 120*a* may implement a rotation of the active and inactive files once the active file reaches a predetermined size and the active file is flushed to persistent memory and/or the persistent storage.

It will be understood that when an entry is written to the mem table, it may contain the journal offset information where the entry is written to the journal. Further, when the mem table is dumped to a B+ Tree, the journal offset information of a last entry may be persisted. This maintenance of the offset information facilitates fast replay of a journal to recreate index information in the event of a service crash on an edge device (e.g., the server node(s) 114*a*). In the event of a crash, the configuration handler 120*a* may determine a last offset from when data was persisted within a latest version of the B+ Tree. The active journal may then be replayed from the last offset and the data may be written to an active mem table. When there is a crash in the system, the configuration handler 120*a* may rotate the journal in accordance with one or more embodiments described above. Thus, the persistent store may be used to make sure all data of inactive journals are written to the B+ Tree to prevent any loss of data.

In one or more embodiments, the configuration handler 120*a* may implement a garbage collection routine. For example, in one or more embodiments, the configuration handler 120*a* may invoke a periodic scheduler job to check a number of index files. If the number of index files is greater than a maximum threshold, the configuration handler 120*a* may move the index files to a separate directory for removal after a predetermined time interval. To maintain redundancy in the event of disk failure, the configuration handler 120*a* may further maintain snapshot(s) of the journal and index directory to be persisted in the blob storage 110.

As mentioned above, and as shown in FIG. 1, the configuration handler 120*a* may further include a validation manager 126*a*. The validation manager 126*a* may provide a framework for automatically validating the configuration(s) 118*a* as well as any modifications made to existing configurations. For example, in one or more embodiments, the validation manager 126*a* implements a framework that provides a declarative way of defining custom validators for a configuration. As an example, if a configuration is an endpoint, then a validator may be implemented to check that the endpoint is in a correct format and reachable.

In one or more embodiments, the validation manager 126*a* facilitates this validation by providing an interface that can be extended to implement custom logic for a validation. The validation manager 126*a* can provide logic to parse and trigger the custom validator. The logic and other related information may be indexed in a persistent store and the validation logic can be scheduled for the configuration(s) 118*a*. In the event that a validator is changed, the validation manager 126*a* may update validation information in the persistent store and trigger the new validation logic.

In one or more embodiments, the validation manager 126*a* may further expose a transformation interface. For example, where there are multiple types of configurations following a variety of structures, the validation manager 126*a* can extend a transformation interface to implement a customer business logic to read the configuration and create configuration structures. To illustrate, where a configuration includes a JSON structure, the validation manager 126*a* can create configurations for deployment by leveraging a transformation interface, which provides an extendible design. The configuration(s) 118*a* can be accessed using a representational state transfer (REST). Thus, any third-party system can be integrated within the configuration framework.

In one or more embodiments, the configuration handler 120*a* may further fetch configurations from a deployed service, which can be further extended to enable the configuration handler 120*a* to act independent of the configuration management system 106 and be integrated within one or more third-party development applications. In one or more embodiments, this enables continuous integration/ continuous deployment (CI/CD) configuration modifications to be provided directly to the configuration handler 120a, which enables the configuration handler 120a to be extended further to orchestrate any configurations required for various service startups.

Figure 2:
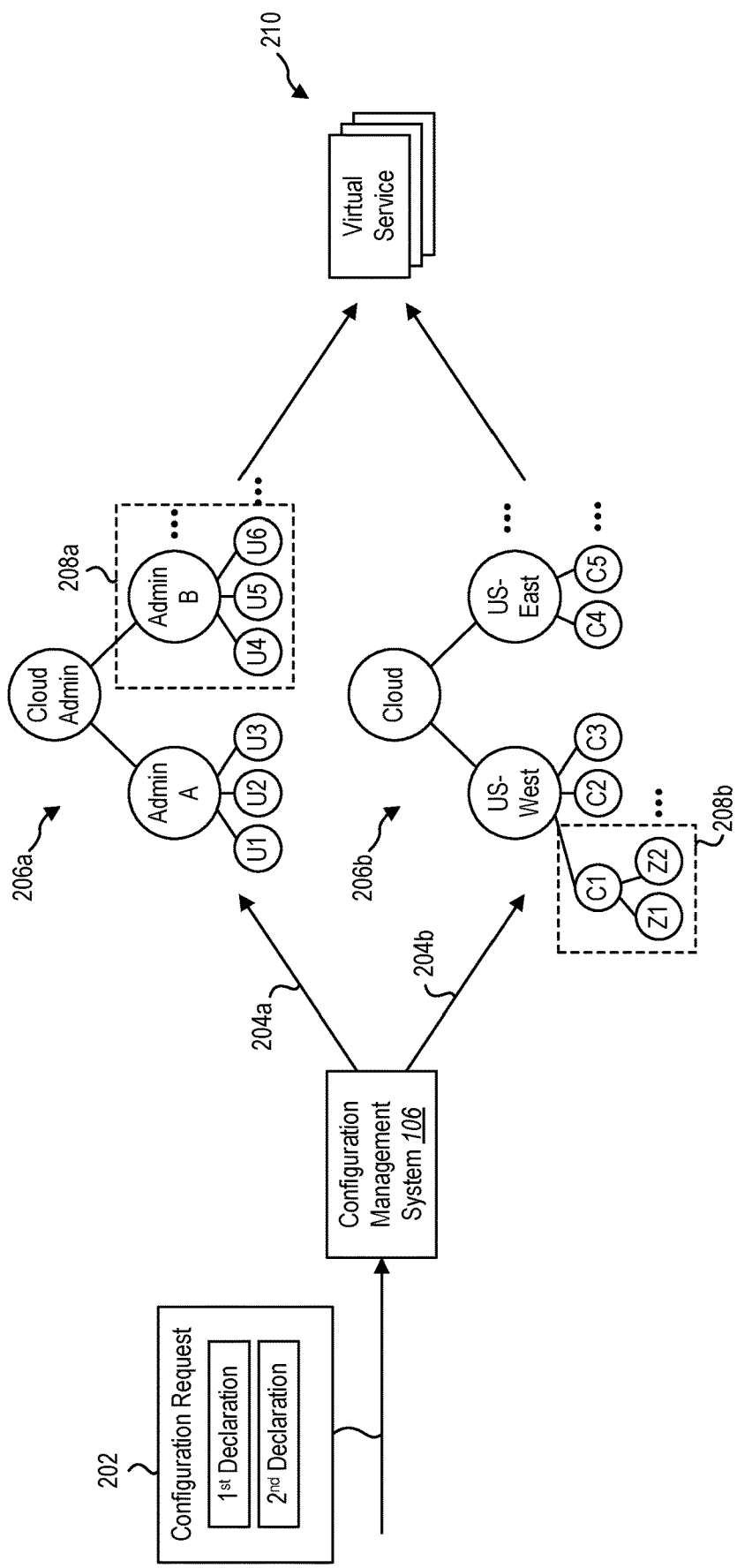
FIG. 2 illustrates an example implementation in which modifications are implemented across configurations in accordance with a hierarchical model.

FIG. 2 illustrates additional information related to modifying configurations on a cloud computing system in accordance with a hierarchical model and based on hierarchical declarations provided within a modification request. As shown in FIG. 2, the configuration management system 106 may receive a modification request 202. The modification request 202 may include instructions associated with modifying a configuration. For example, the modification request 202 may include an identification of a key pair, such as a base configuration identifier and a version identifier. In one or more embodiments, the modification request 202 includes instructions to upgrade or downgrade from a current configuration. In one or more embodiments, the modification request 202 includes instructions to refresh a current configuration. Additional information in connection with the types of modification requests and associated mechanisms will be discussed below in connection with FIG. 3.

As further shown in FIG. 2, the modification request 202 may include one or more declarations included therein indicating one or more characteristics of configurations to which the modification request 202 should apply. For example, in the example shown in FIG. 2, the modification request 202 may include a first declaration and a second declaration indicating two different characteristics of the target configurations. Other modification request may include fewer or additional declarations. As indicated above, the declarations may specifically refer to hierarchical declarations that indicate specific nodes or levels of one or more hierarchical models in accordance with one or more embodiments described herein.

Based on the modification request 202, the configuration management system 106 may determine a first characteristic identifier 204a and a second characteristic identifier 204b to use in identifying specific nodes of corresponding hierarchical models 206a-206b. As a first illustrative example, the configuration management system 106 may identify a first hierarchical model indicating levels of permissions associated with modifying configurations. As shown in FIG. 2, the first hierarchical model 206a may include a top level of "cloud admin" indicating a permission to modify any configuration on the cloud computing system. At a second level, the first hierarchical model 206a may include nodes indicating additional administrators (e.g., Admin A, Admin B) having permissions associated with modifying respective subsets of configurations, such as organizational level, deployment level, or other permission-based grouping of configurations. At a lowest level, the first hierarchical model 206a may include nodes representative of individual users (e.g., U1-U6) having limited permissions associated with specific server nodes, deployments, or other grouping of configurations.

Similar to the first hierarchical model 206a, a second hierarchical model 206b may include a hierarchy of configurations based on geographic groupings and/or computational groupings. For instance, in the illustrated example, the second hierarchical model 206b may include a top node inclusive of all server nodes and/or virtual services within the cloud computing system 102. At a second level, the second hierarchical model 206b may include nodes inclusive of server nodes and/or virtual services within respective datacenters (e.g., US-West, US-East). Under the respective datacenter nodes, the second hierarchical model 206b may include nodes representative of individual clusters (e.g., C1-C5). Further, within individual clusters, the second hierarchical model 206b may include nodes representative of specific computing zones (e.g., Z1, Z2), server racks, edge networks, or any other grouping of server nodes and/or virtual services.

It will be appreciated that these hierarchical models are illustrated by way of example and not limitation. Indeed, as mentioned above, the configuration management system 106 may make use of any structure that is hierarchical in nature that may be used to identify specific groups and sub-groups of server nodes and/or virtual services on the cloud computing system 102. For instance, in addition to other examples discussed above, the configuration management system 106 can utilize models that indicate groupings of services based on a geographic hierarchical structure with nodes being associated with physical locations of server nodes on which virtual services are implemented. As anther example, the configuration management system 106 may utilize a model that indicates groupings of services based on a computational hierarchical structure associated with groupings of computing zones on which the virtual services are implemented. In one or more embodiments, the configuration management system 106 may utilize a model that indicates groupings of services based on a permission hierarchical structure associated with levels of access policies that are applicable to the plurality of virtual services and/or configurations themselves.

As shown in FIG. 2, the configuration management system 106 may consider a combination of hierarchical structures to identify a subset of virtual services to which the modification request 202 should apply. For instance, in the example shown in FIG. 2, the configuration management system 106 may identify a first grouping of virtual services based on a portion 208a of the first hierarchical structure 206a indicated by the first declaration. Similarly, the configuration management system 106 may identify a second grouping of virtual services based on a portion 208b of the second hierarchical structure 206b indicated by the second declaration. In this example, the corresponding grouping of virtual services to be affected by the modification request 202 may include virtual services within a first node cluster (C1) for which a particular administrator (Admin B) and associated users (U4-U6) have permissions to read, write, or otherwise access.

As shown in FIG. 2, the configuration management system 106 may identify a subset of virtual services 210 based on a combination of the two groupings identified from the respective hierarchical models 206a-b. For example, the configuration management system 106 may identify the subset of virtual services 210 based on a union of virtual services that fit the criteria of both the groupings identified from the hierarchical models 206a-b.

Figure 3:
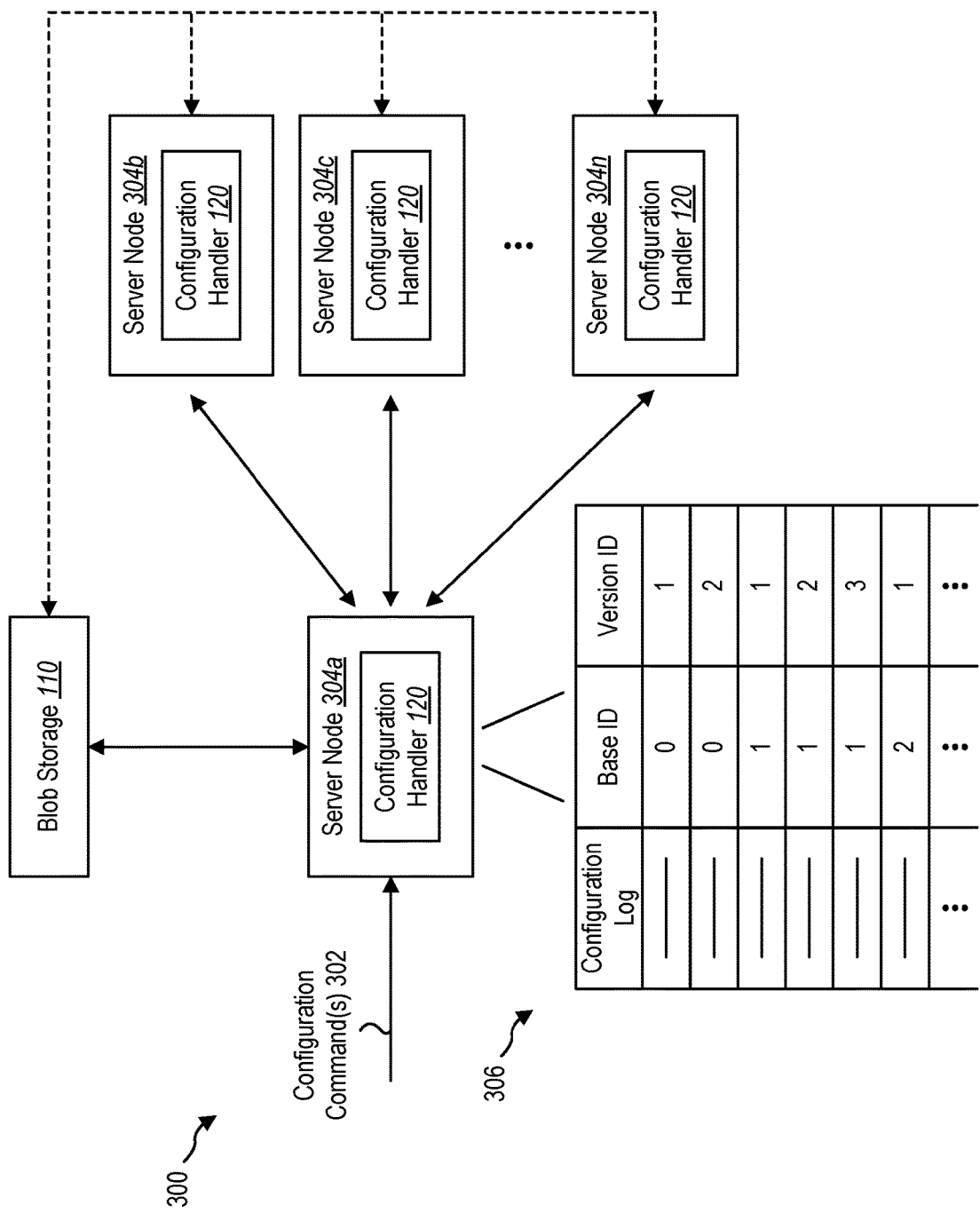
FIG. 3 illustrates an example implementation showing synchronization of configuration modifications in accordance with one or more embodiments.

Upon identifying the subset of virtual services (e.g., virtual services 210), the configuration management system 106 may cause service modifications to be enacted or otherwise applied to the subset of virtual services in accordance with one or more embodiments described herein. FIG. 3 provides additional information in connection with one or more of these embodiments. In particular, FIG. 3 shows an example workflow 300 showing example techniques, methods, and protocols that may be utilized in carrying out instructions included within a modification request that is provided to a server node 304a that is included or otherwise associated with the subset of virtual services identified by the configuration management system 106.

As shown in FIG. 3, an example server node 304a may receive configuration command(s) 302 indicating instructions for modifying configurations on an identified subset of virtual services. In response to the configuration command(s) 302, a configuration handler 120 may initiate an update or refresh of a configuration thereon in accordance with one or more embodiments. For example, similar to one or more embodiments described above, the configuration handler 120 may maintain an update record 306 including configuration logs and associated key pairs. In particular, the update record 306 may include base configuration identifiers and corresponding sub-version identifiers.

As indicated above, in one or more embodiments, the configuration handler 120 maintains the update record 306 on a persistent store that is persisted locally on the server node 304a. In one or more embodiments, the configuration handler 120 updates the configuration based on information contained within the update record 306. In one or more embodiments, the configuration handler 120 identifies a particular update file or associated instructions on the blob storage 110 based on a key pair from the update record 306.

While not shown in FIG. 3, in one or more embodiments, the update record 306 includes additional indexes for storing configuration information thereon. For example, in one or more embodiments, the configuration handler 120 may maintain a global configuration version identifier and a configuration event key. The global configuration version identifier may be used to store bookkeeping information to ascertain version changes and ordering of changes across configurations. When the configuration event key is updated, the configuration handler 120 determines a change (e.g., a delta) since a last configuration synchronization with the configuration event key depicted the delta. In one or more embodiments, the configuration handler 120 deletes old keys as they become deleted.

In addition to maintaining the various keys, the configuration handler 120 may perform one of a variety of modifications based on the configuration command(s) 302. For example, in one or more embodiments, the configuration handler 120 may perform a configuration update. In this example, the configuration handler 120 can parse configuration files and obtain configuration information. As will be discussed in further detail below, the configuration handler 120 can acquire a lock and become a leader in processing the configuration(s) for the server node 304a as well as other server nodes 304b-n within a subset of server nodes. Upon determining that the lock has been acquired, the configuration handler 120 can update bookkeeping information and broadcast a local version number. The new keys can be added to the update record 306 and a synchronization mechanism can be triggered.

In another example, the configuration handler 120 can perform a configuration refresh. For example, the configuration handler 120 may trigger a configuration refresh when a configuration is updated in a cluster. The configuration handler 120 may update keys in the cluster and trigger a similar synchronization mechanism as just mentioned above. In one or more embodiments, the configuration handler 120 may be elected as a leader for triggering the refresh mechanism. In the event of a failure, the configuration handler 120 can retry and/or route the configuration command(s) 302 to another node within the subset of server nodes.

In one or more embodiments, the server node 304a may refer to one of a plurality of server nodes 304a-n that receive the configuration command(s) 302. Indeed, in one or more embodiments, the server node 304a refers to one node of a subset of server nodes that are identified based on the hierarchical declarations provided via the modification request. As will be discussed below, the configuration handler 120 may implement a synchronization mechanism for modifying a configuration on the server node 304a. Further, as mentioned above, the configuration handler 120 may initiate a synchronization protocol or a gossip protocol.

In one or more embodiments, the configuration handler 120 may initiate a synchronization mechanism based on a deployment environment. For example, as mentioned above, the configuration handler 120 may invoke a synchronization protocol or a gossip protocol for disseminating configuration information across the plurality of server nodes 304a-n. In both of the protocols, the configuration handler 120 may maintain routing information in a routing table, which may be used to implement the synchronization and/or gossip protocols. The routing table may include internet protocol (IP) addresses, service names, service ports, and an identification of the subset of server nodes (e.g., associated with the subset of services identified by the configuration management system 106). For smaller computing zones, the routing table may include information on all server nodes.

When a synchronization mechanism is triggered, the configuration handler 120 may read the deltas from the persistent store and updates in-memory snapshots for virtual services. Once the data is updated in-memory, a snapshot may be created for the service in distributed storage (e.g., the blob storage 110). Where there are concurrent requests in the system, there may be a scenario where a synchronization mechanism starts at different times for different configuration versions. Nevertheless, whether implementing the synchronization protocol or gossip protocol, the configuration framework will ensure that a latest configuration value is synchronized across the computing zone.

As noted above, the synchronization protocol may be invoked based on a number of server nodes or services being less than a relevant threshold or within a single computing zone (e.g., where a routing table includes information for all relevant nodes affected by a modification request). Where the synchronization mechanism is triggered and a snapshot is successfully created in the blob storage 110, a broadcaster thread may broadcast the changed configuration value to all affected server nodes. When a quorum of nodes has responded with successful responses, the configuration handler 120 may update a bookkeeping marker in the persistent store and complete the synchronization process. When a remote peer (e.g., obtained from a routing table) receives a broadcast request, the remote peer can refresh an in-memory snapshot by reading a latest snap-shot from the blob storage 110. In the event that the successful response is not received from a full quorum of server nodes, the synchronization mechanism may repeat by sending the requests to failed nodes. In the event that the synchronization protocol is unsuccessful, the configuration handler 120 and/or configuration management system 106 may invoke the gossip protocol.

As noted above, in the event that synchronization protocol fails, or where a number of server nodes affected by a modification request exceeds a threshold, or where a modification request affects server nodes across multiple node clusters, datacenters, or other granularity of computing zones, the configuration handler 120 may invoke a gossip protocol. In this example, the first server node 304a may be elected as a leader node for the plurality of server nodes 304a-n.

In one or more embodiments, the leader node (i.e., the first server node 304a) may include or verity that it possesses up-to-date information of a version number. Each node in the grouping of server nodes may broadcast a local version number. The version number may be the same as a global configuration version key in a persistent store of the leader node. A periodic thread in the configuration handler 120 may wake up after a predetermined (e.g., fixed) interval to send the global counter information.

The peer nodes (e.g., server nodes 304b-n) may compare the global counter value with respective configuration versions. In the case the local counter value is less than the received value, the configuration handler 120 on the additional server nodes 304b-n may trigger a configuration refresh mechanism. Alternatively, where the local counter value is greater than the received value, the configuration handler 120 on the additional server nodes 304b-n may trigger a configuration refresh status. On receiving a refresh status as a response, the configuration handler 120 may update an in-memory configuration snapshot. Once the synchronization mechanism is done, the configuration handler 120 may update a bookkeeping market in the persistent store.

Figure 4:
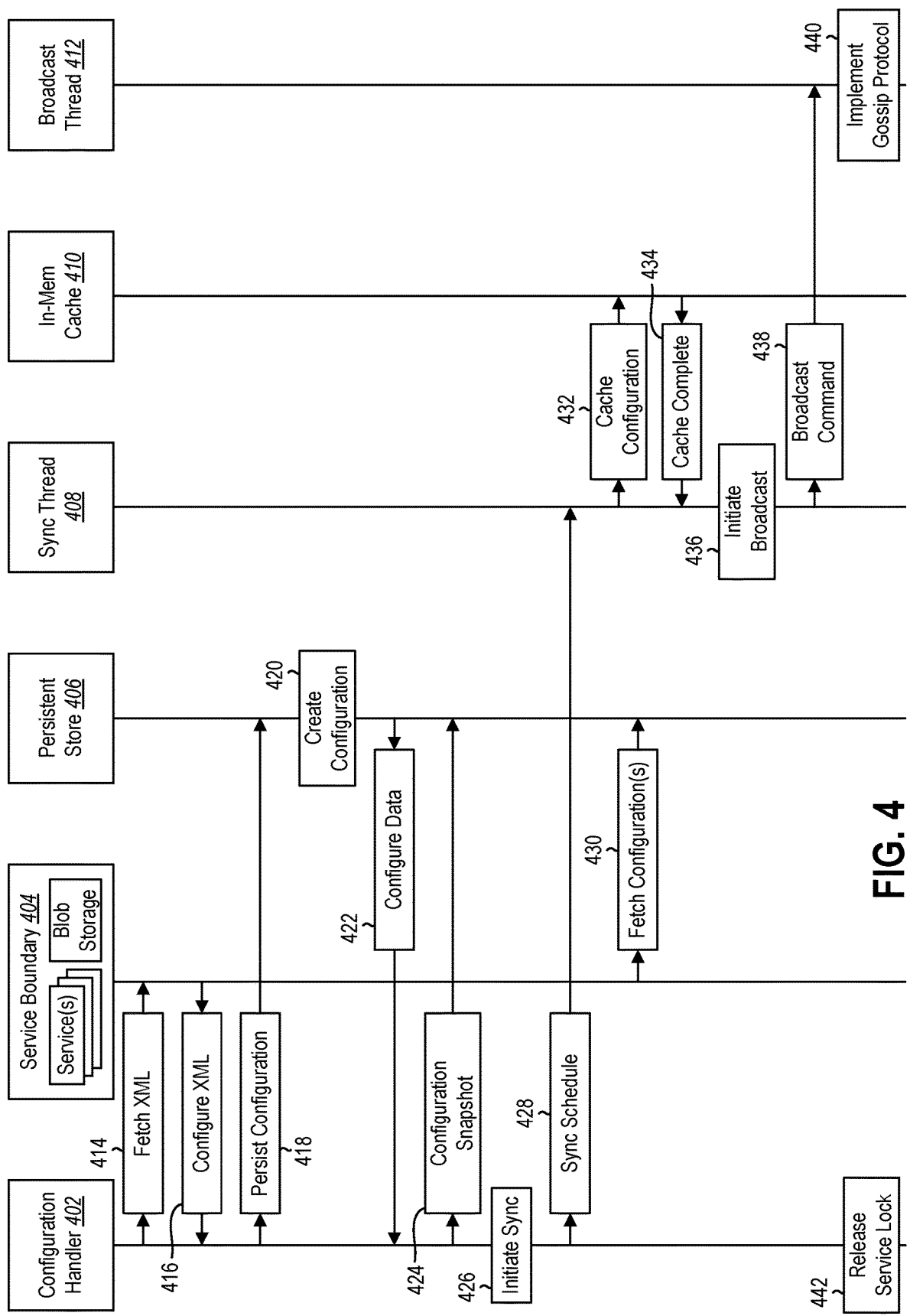
FIG. 4 illustrates an example series of interactions between components of the systems described herein in connection with updating or otherwise modifying configurations across server nodes of a cloud computing system.

FIG. 4 illustrates an example series of interactions that may occur between example components of a configuration management system 106 and components of an example configuration handler 120 in connection with examples and embodiments described herein. Indeed, it will be appreciated that FIG. 4 provides a more specific implementation of the configuration management system 106 and configuration handler 120 that includes similar features and functionalities described in connection with various examples above.

For example, FIG. 4 illustrates an example implementation showing a configuration handler 402 and a service boundary 404 having virtual services and a blob storage accessible thereto. The environment may further include a persistent store 406, a sync thread 408, an in-mem cache 410, and a broadcast thread 412. Each of these components may be implemented across the configuration handler 120 and/or configuration management system 106 on server devices of the cloud computing system 102. In one or more embodiments, the configuration handler 402, persistent store 406, sync thread 408, in-mem cache 410, and broadcast thread 412 may be implemented on a particular server node.

As shown in FIG. 4, the configuration handler 402 may receive a modification request including instructions for modifying one or more service configurations. In response to receiving the modification request, the configuration handler 402 may perform an act 414 of fetching an XML file from a service of the service boundary 404. As shown in FIG. 4, the configuration handler 402 may perform an act 416 of receiving a configuration XML (e.g., a configuration XML file).

The configuration handler 402 may perform an act 418 of persisting the configuration on the persistent store 406. The persistent store 406 may perform an act 420 of creating a configuration on the server node. In one or more embodiments, the persistent store 406 performs an act 422 of providing the configuration data to the configuration handler 402. In one or more embodiments described above, the configuration handler 402 may maintain a record of keys indicating a current configuration and sub-version on the persistent store 406. In addition, the configuration handler 402 may maintain a record of previous configurations and versions.

As shown in FIG. 4, the configuration handler 402 may perform an act 424 of providing a configuration snapshot for storage on the blob storage of the service boundary 404. As noted above, the blob storage may provide a storage resource for maintaining any amount of configuration data thereon for later access by the configuration handler 402.

As shown in FIG. 4, the configuration handler 402 may perform an act 426 of initiating a synchronization mechanism. In one or more embodiments, the configuration handler 402 initiates the synchronization by performing an act 428 of scheduling the synchronization, which may involve providing the synchronization schedule to the synchronization thread 408. Concurrent with implementing the synchronization mechanism, the service(s) may perform an act 430 of fetching configuration data from the blob storage.

As shown in FIG. 4, the sync thread 408 may perform an act 432 of caching the configuration with the in-mem cache. As discussed above, this may involve updating journal entries, storing journal entries within an in-mem cache, and committing in-mem cache data to B+ Tree structures. As shown in FIG. 4, the sync thread 408 may perform an act 434 of receiving an indication that the cache is complete. For example, the sync thread 408 may receive an indication of a status that a B+ Tree has been updated and an active in-mem cache is current.

As noted above, the sync thread 408 may implement a synchronization protocol and/or a gossip protocol. In this example, the sync thread 408 may perform acts related to the synchronization protocol. For example, as shown in FIG. 4, the sync thread 408 may perform an act 436 of initiating a broadcast. In particular, the sync thread 408 may perform an act 438 of broadcasting a command to other server nodes. As discussed above, this may involve broadcasting a current configuration and version identification to other server nodes of a computing zone to comparison to configuration data on the respective server nodes. As shown in FIG. 4, the sync thread 408 may broadcast the command to a broadcast thread 412.

As shown in FIG. 4, the broadcast thread 412 may perform an act of implementing gossip protocol 440. In one or more embodiments, the broadcast thread 412 initiates gossip protocol based on detecting a failure of the synchronization protocol. Alternatively, in one or more embodiments, the broadcast thread 412 initiated gossip protocol based on a number of server nodes affected by a modification request exceeding a threshold number of server nodes.

As discussed in one or more examples above, the configuration handler 402 may acquire a lock as part of implementing the synchronization mechanism. In this example, the configuration handler 402 may finalize the synchronization process by performing an act 442 of releasing a service lock. In one or more embodiments, the configuration handler 402 releases the service lock based on a notification received from the sync thread 408 indicating that the synchronization protocol was effective. Alternatively, in one or more embodiments, the configuration handler 402 releases the service lock based on a notification received from the broadcast thread 412 indicating success or completion of the gossip protocol.

Figure 5:
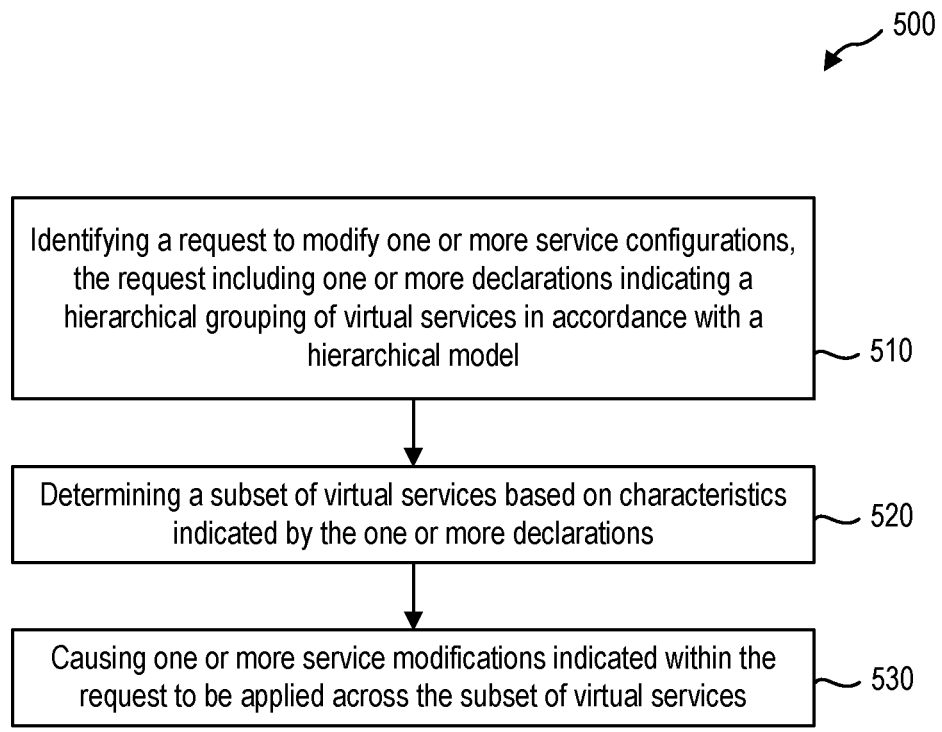
FIG. 5 illustrates an example series of acts for modifying configurations based on a hierarchical model in accordance with one or more embodiments.

Turning now to FIG. 5, this figure illustrates an example flowchart including a series of acts for processing a configuration modification request and implementing the request across a subset of server nodes and/or services in accordance with one or more embodiments described herein. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device)

to perform the acts of FIG. 5. In still further embodiments, a system can perform the acts of FIG. 5.

As mentioned above, FIG. 5 illustrates a series of acts 500 related to processing a configuration modification request and implementing the request across a subset of server nodes and/or services. As shown in FIG. 5, the series of acts 500 includes an act 510 of identifying a request to modify one or more service configurations, the request including one or more declarations indicating a hierarchical grouping of virtual services in accordance with a hierarchical model. For example, in one or more embodiments, the act 510 involves identifying a request to modify service configurations for a plurality of virtual services on a cloud computing system, the request including one or more hierarchical declarations indicating a grouping of virtual services from the plurality of virtual services. The one or more hierarchical declarations may indicate one or more service characteristics in accordance with a hierarchical model of characteristics for the plurality of virtual services on the cloud computing system.

As further shown in FIG. 5, the series of acts 500 may include an act 520 of determining a subset of virtual services based on characteristics indicated by the one or more declarations. For example, in one or more embodiments, the act 520 involves determining a subset of virtual services from the plurality of virtual services based on the one or more service characteristics indicated by the one or more hierarchical declarations. In one or more embodiments, determining the subset of virtual services including identifying a plurality of server nodes hosting the subset of virtual services.

As further shown in FIG. 5, the series of acts 500 includes an act 530 of causing one or more service modifications indicated within the request to be applied across the subset of virtual services. For example, in one or more embodiments, the act 530 involves causing one or more service modifications indicated within the request to be applied to service configurations for the subset of virtual services.

In one or more embodiments, the hierarchical model includes a geographic hierarchical structure associated with a physical location of server nodes on which the plurality of virtual services are implemented. In one or more embodiments, the hierarchical model includes a computational hierarchical structure associated with groupings of computing zones on which the plurality of virtual services are implemented. In one or more embodiments, the hierarchical model includes a permission hierarchical structure associated with levels of access policies that are applicable to the plurality of virtual services.

In one or more embodiments, the series of acts 500 includes an act of maintaining a record of base configuration identifiers corresponding to base versions of the service configurations and associated version identifiers corresponding to sub-versions of the service configurations indexed within the record according to key pairs. Further, in one or more embodiments, the series of acts 500 includes an act of storing, upon causing the one or more service modifications to be applied to the service configurations for the subset of virtual services, an updated key pair including a base version identifier and a sub-version identifier indicating a log of changes implemented in response to the request to modify service configurations.

In one or more embodiments, causing the one or more service modifications to be applied to service configurations for the subset of virtual services includes performing a set of acts for each server node from a plurality of server node hosting the plurality of virtual services. For example, for each server node, causing the service modification(s) to be applied may include writing modifications to the service configurations to a journal log, persisting the modifications in a memory table, and flushing the modifications from the memory table to a B+ tree on a disc storage of a distributed blob storage on the cloud computing system. The series of acts 500 may further include performing garbage collection on redundant copies of the B+ tree based on one or more B+ trees being redundant to a current version of the B+ tree and being on a persistent store of a corresponding server node a threshold period of time.

In one or more embodiments, causing the one or more service modifications to be applied to service configurations for the subset of virtual services includes determining that a number of the subset of virtual services indicated by the one or more hierarchical declarations exceeds a threshold number of virtual services. Causing the service modification(s) to be applied may also include, based on the number of the subset of virtual services exceeding the threshold number of virtual services, invoking a gossip protocol in which a primary server node confirms a current base version and sub-version of a configuration and provides instructions to additional nodes in connection with updating to the current version of the configuration.

In one or more embodiments, causing the one or more service modifications to be applied to service configurations for the subset of virtual services includes determining that a number of the subset of virtual services indicated by the one or more hierarchical declarations is less than a threshold number of virtual services. In one or more embodiments, causing the service modification(s) to be applied further includes, based on the number of the subset of virtual services being less than the threshold number of virtual services, invoking a synchronization protocol in which a key pair for a current base version and sub-version of a configuration are broadcast to server nodes on which the subset of virtual services are hosted.

Figure 6:
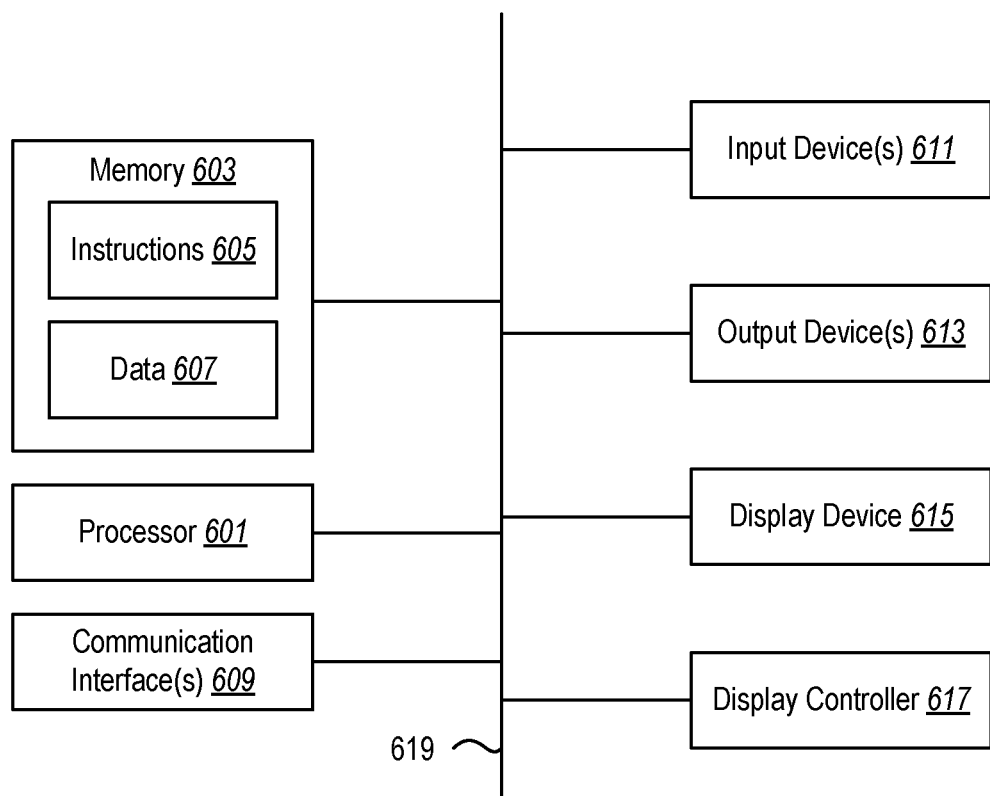
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a request to modify service configurations for a plurality of virtual services on a cloud computing system, the request including a hierarchical declaration indicating a characteristic corresponding to a grouping of virtual services from the plurality of virtual services, the characteristic being represented within a first hierarchical model that defines different levels of the characteristic in association with server nodes executing the plurality of virtual services on the cloud computing system;
    determining a subset of virtual services from the plurality of virtual services based on the characteristic indicated by the hierarchical declaration; and
    in response to determining that the subset of virtual services satisfy predefined criteria, invoking a synchronization protocol in which a key pair for a current base version and sub-version of a configuration are broadcast to server nodes on which the subset of virtual services are hosted, the broadcast causing one or more service modifications indicated within the request to be applied to service configurations for the subset of virtual services.

2. The method of claim 1, wherein the first hierarchical model includes a geographic hierarchical structure based on physical locations of server nodes on which the plurality of virtual services are implemented.

3. The method of claim 1, wherein the first hierarchical model includes a computational hierarchical structure associated with groupings of computing zones on which the plurality of virtual services are implemented.

4. The method of claim 1, wherein the request further includes a second hierarchical declaration indicating a permission or access policy corresponding to the grouping of virtual services from the plurality of virtual services, the permission or access policy being represented within a second hierarchical model that defines different levels of the permission or access policy in association with the plurality of virtual services on the cloud computing system.

5. The method of claim 1, wherein determining the subset of virtual services including identifying a plurality of server nodes hosting the subset of virtual services.

6. The method of claim 1, further comprising maintaining a record of base configuration identifiers corresponding to base versions of the service configurations and associated version identifiers corresponding to sub-versions of the service configurations indexed within the record according to key pairs.

7. The method of claim 6, further comprising, upon causing the one or more service modifications to be applied to the service configurations for the subset of virtual services, storing an updated key pair including a base version identifier and a sub-version identifier indicating a log of changes implemented in response to the request to modify service configurations.

8. The method of claim 6, wherein causing the one or more service modifications to be applied to service configurations for the subset of virtual services includes, for each server node from a plurality of server node hosting the plurality of virtual services:
writing modifications to the service configurations to a journal log;
persisting the modifications in a memory table; and
flushing the modifications from the memory table to a B+ tree on a disc storage of a distributed blob storage on the cloud computing system.

9. The method of claim 8, further comprising performing garbage collection on redundant copies of the B+ tree based on one or more B+ trees being redundant to a current version of the B+ tree and being on a persistent store of a corresponding server node a threshold period of time.

10. The method of claim 1, wherein causing the one or more service modifications to be applied to service configurations for the subset of virtual services includes:
determining that a number of the subset of virtual services indicated by the hierarchical declaration exceeds a threshold number of virtual services; and
based on the number of the subset of virtual services exceeding the threshold number of virtual services, invoking a gossip protocol in which a primary server node confirms a current base version and sub-version of a configuration and provides instructions to additional nodes in connection with updating to the current base version of the configuration.

11. The method of claim 1, wherein causing the one or more service modifications to be applied to service configurations for the subset of virtual services includes:
determining that a number of the subset of virtual services indicated by the hierarchical declaration is less than a threshold number of virtual services; and
based on the number of the subset of virtual services being less than the threshold number of virtual services, invoking a synchronization protocol in which a key pair for a current base version and sub-version of a configuration are broadcast to server nodes on which the subset of virtual services are hosted.

12. A system, comprising:
one or more processors;
memory in electronic communication with the one or more processors;
instructions stored in the memory, the instructions being executable by the one or more processors to:
identify a request to modify service configurations for a plurality of virtual services on a cloud computing system, the request including a hierarchical declaration indicating a characteristic corresponding to a grouping of virtual services from the plurality of virtual services, the characteristic being represented within a first hierarchical model that defines different levels of the characteristic in association with server nodes executing the plurality of virtual services on the cloud computing system;
determine a subset of virtual services from the plurality of virtual services based on the characteristic indicated by the hierarchical declaration; and
in response to determining that the subset of virtual services satisfy predefined criteria, invoke a synchronization protocol in which a key pair for a current base version and sub-version of a configuration are broadcast to server nodes on which the subset of virtual services are hosted, the broadcast causing one or more service modifications indicated within the request to be applied to service configurations for the subset of virtual services.

13. The system of claim 12, wherein the first hierarchical model includes one or more of:
a geographic hierarchical structure based on a physical location of server nodes on which the plurality of virtual services are implemented; and
a computational hierarchical structure associated with groupings of computing zones on which the plurality of virtual services are implemented.

14. The system of claim 12, wherein determining the subset of virtual services including identifying a plurality of server nodes hosting the subset of virtual services.

15. The system of claim 12, wherein causing the one or more service modifications to be applied to service configurations for the subset of virtual services includes:
determining that a number of the subset of virtual services indicated by the hierarchical declaration exceeds a threshold number of virtual services; and
based on the number of the subset of virtual services exceeding the threshold number of virtual services, invoking a gossip protocol in which a primary server node confirms a current base version and sub-version of a configuration and provides instructions to additional nodes in connection with updating to the current version of the configuration.

16. The system of claim 12, wherein causing the one or more service modifications to be applied to service configurations for the subset of virtual services includes:
determining that a number of the subset of virtual services indicated by the hierarchical declaration is less than a threshold number of virtual services; and
based on the number of the subset of virtual services being less than the threshold number of virtual services, invoking a synchronization protocol in which a key pair for a current base version and sub-version of a configuration are broadcast to server nodes on which the subset of virtual services are hosted.

17. A non-transitory computer-readable medium storing instructions thereon that, when executed by one or more processors, causes a server system to:
identify a request to modify service configurations for a plurality of virtual services on a cloud computing system, the request including a hierarchical declaration indicating a characteristic corresponding to a grouping of virtual services from the plurality of virtual services, the characteristic being represented within a first hierarchical model that defines different levels of the characteristic in association with server nodes executing the plurality of virtual services on the cloud computing system;

determine a subset of virtual services from the plurality of virtual services based on the characteristic indicated by the hierarchical declaration; and in response to determining that the subset of virtual services satisfy predefined criteria, invoke a synchronization protocol in which a key pair for a current base version and sub-version of a configuration are broadcast to server nodes on which the subset of virtual services are hosted, the broadcast causing one or more service modifications indicated within the request to be applied to service configurations for the subset of virtual services.

18. The non-transitory computer-readable medium of claim 17, wherein the first hierarchical model includes one or more of:

a geographic hierarchical structure based on a physical location of server nodes on which the plurality of virtual services are implemented; and a computational hierarchical structure associated with groupings of computing zones on which the plurality of virtual services are implemented.

19. The non-transitory computer-readable medium of claim 17, wherein causing the one or more service modifications to be applied to service configurations for the subset of virtual services includes:

determining that a number of the subset of virtual services indicated by the hierarchical declaration exceeds a threshold number of virtual services; and based on the number of the subset of virtual services exceeding the threshold number of virtual services, invoking a gossip protocol in which a primary server node confirms a current base version and sub-version of a configuration and provides instructions to additional nodes in connection with updating to the current base version of the configuration.

20. The non-transitory computer-readable medium of claim 17, wherein causing the one or more service modifications to be applied to service configurations for the subset of virtual services includes:

determining that a number of the subset of virtual services indicated by the one or more hierarchical declarations is less than a threshold number of virtual services; and based on the number of the subset of virtual services being less than the threshold number of virtual services, invoking a synchronization protocol in which a key pair for a current base version and sub-version of a configuration are broadcast to server nodes on which the subset of virtual services are hosted.

21. The method of claim 1, wherein the subset of virtual services satisfy predefined criteria when a number of the subset of virtual services is less than a threshold number of virtual services or when the subset of virtual services are within a single compute zone.

* * * * *